May 15, 1923.
W. W. HOLLOWAY ET AL
1,455,052
RADIANT SUPPORT AND HOLDER FOR GAS HEATERS
Filed July 26, 1922     4 Sheets-Sheet 3
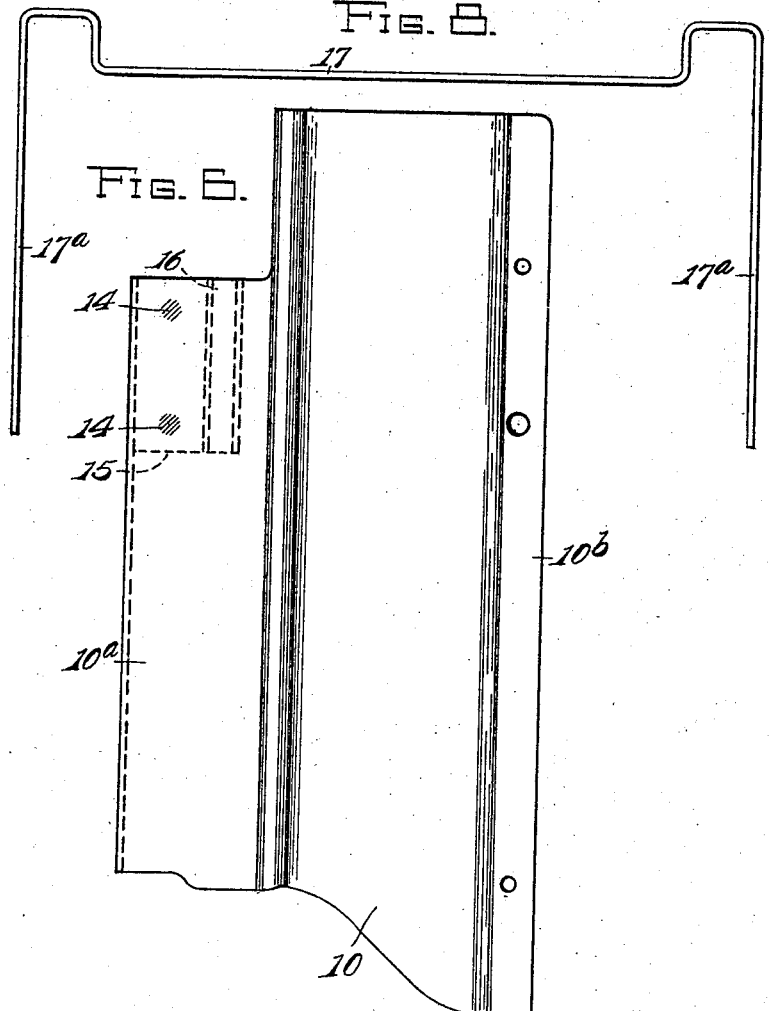

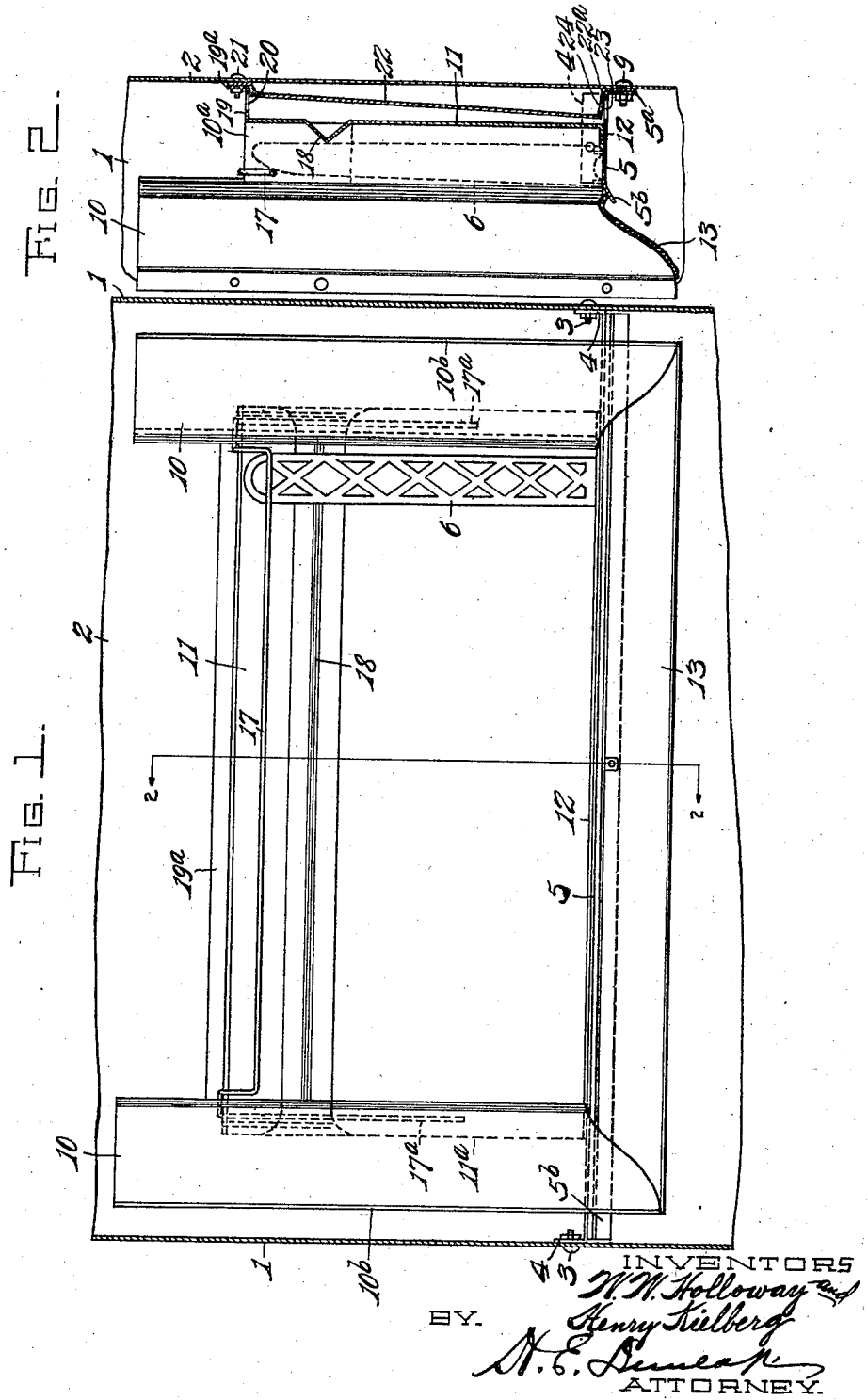

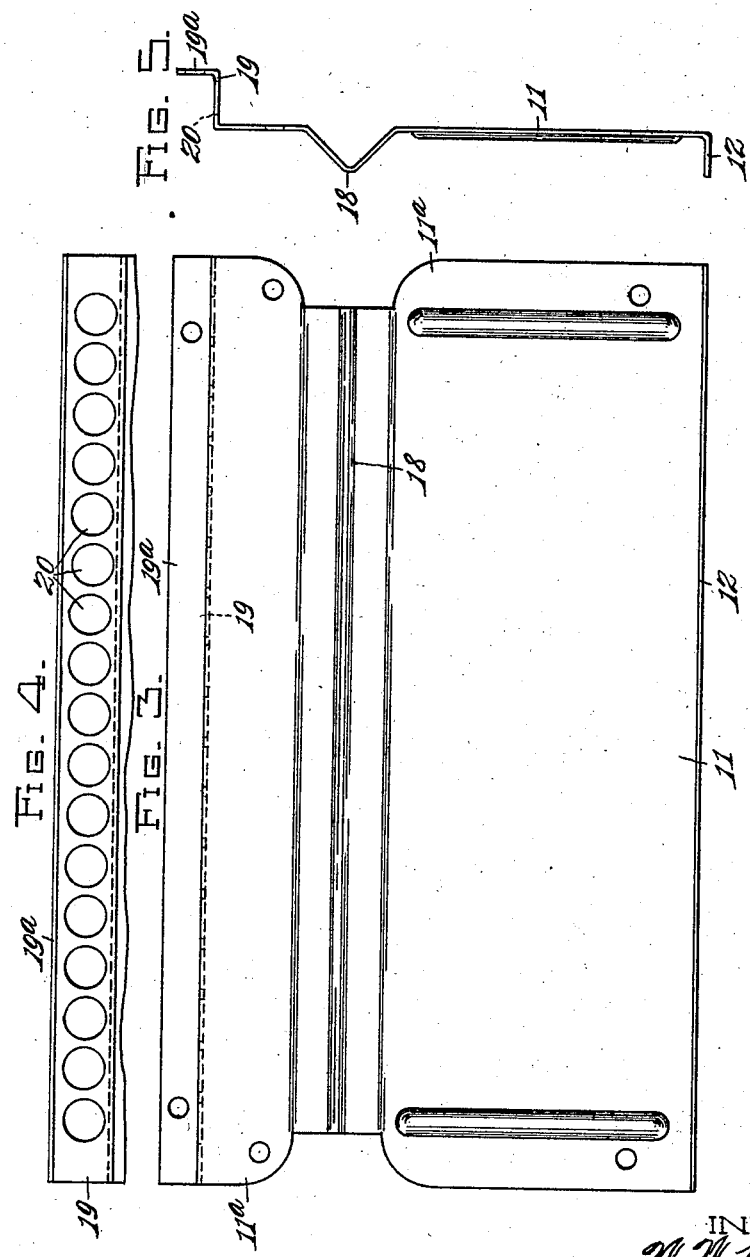

May 15, 1923. 1,455,052
W. W. HOLLOWAY ET AL
RADIANT SUPPORT AND HOLDER FOR GAS HEATERS
Filed July 26, 1922 4 Sheets-Sheet 4
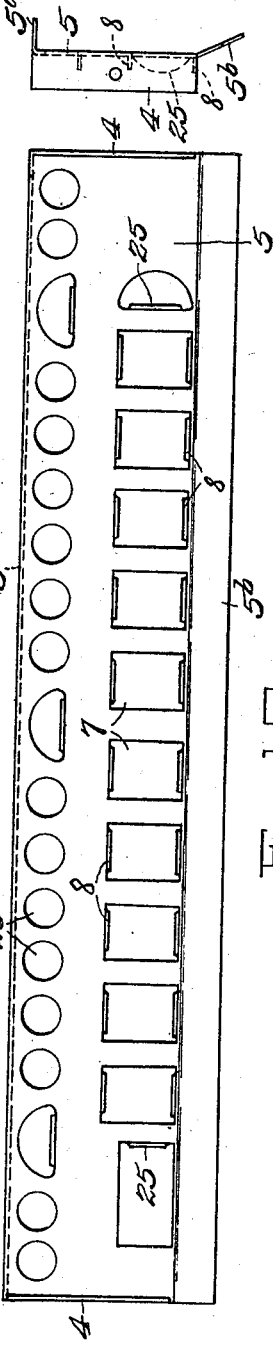
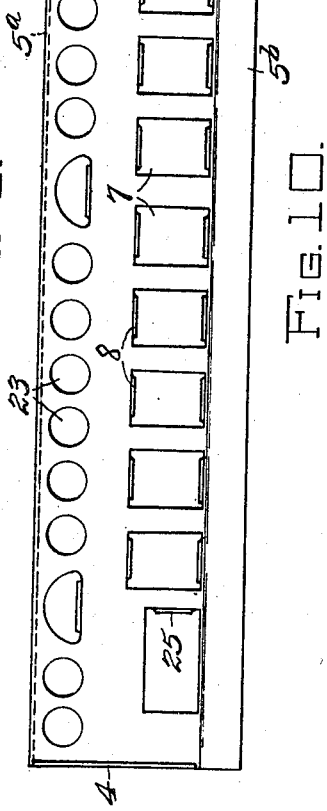
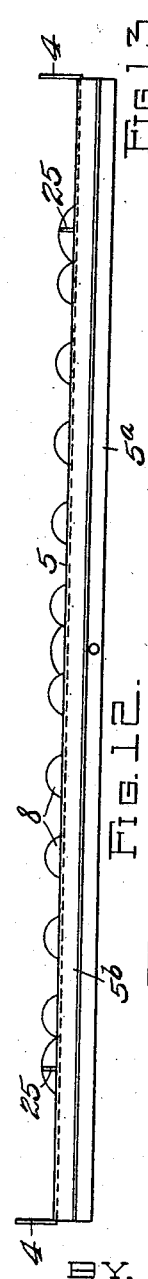
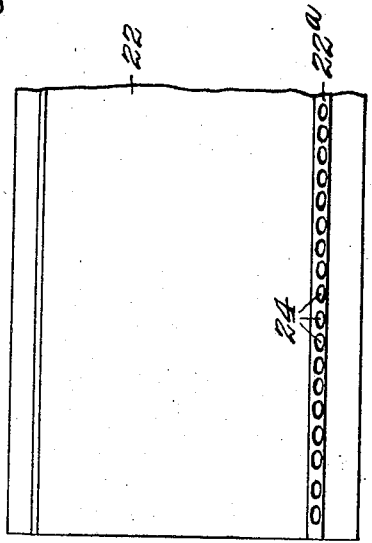
INVENTORS
W. W. Holloway and
Henry Kielberg.
ATTORNEY.

Patented May 15, 1923.

1,455,052

UNITED STATES PATENT OFFICE.

WILLIAM W. HOLLOWAY, OF WHEELING, WEST VIRGINIA, AND HENRY KIELBERG, OF MARTINS FERRY, OHIO, ASSIGNORS TO WHITAKER-GLESSNER COMPANY, OF WHEELING, WEST VIRGINIA, A CORPORATION OF WEST VIRGINIA.

RADIANT SUPPORT AND HOLDER FOR GAS HEATERS.

Application filed July 26, 1922. Serial No. 577,725.

*To all whom it may concern:*

Be it known that we, WILLIAM W. HOLLOWAY and HENRY KIELBERG, citizens of the United States of America, and residents, respectively, of Wheeling, county of Ohio, and State of West Virginia, and Martins Ferry, county of Belmont, and State of Ohio, have invented certain new and useful Improvements in Radiant Supports and Holders for Gas Heaters, of which the following is a specification.

This invention relates broadly to radiant heaters of sheet-metal type, and more specifically to supporting and retaining means for the radiants of such heaters.

The primary object of the invention is to provide, in a radiant heater, a radiant seat or support having associated therewith a sheet-metal back-wall shaped to form a rest against which the backs of the radiants seat and by which they are braced in the rear.

A further object is to provide a shiftable device whereby the upper ends of the radiants are engaged and retained against forward tilting movement.

With these and other objects in view, the invention resides in the features of construction, arrangement of parts and combinations of elements which will hereinafter be fully described, reference being had to the accompanying drawings, in which—

Figure 1 is a vertical section of the front portion of a stove casing, showing the present invention in front elevation;

Figure 2 is a section on line 2—2, Fig. 1;

Figure 3 is an enlarged front elevation of the back-wall, detached;

Figures 4 and 5 are, respectively, top plan and end views of the same;

Figures 6 and 7 are, respectively, inner face and upper end elevations of a side plate or shield;

Figure 8 is an elevation of the retaining rod, detached;

Figure 9 is an enlarged top plan view of the radiant seat;

Figures 10 and 11 are, respectively, front edge and end elevations of the same;

Figure 12 is a rear elevation of a portion of the inclined plate; and—

Figure 13 is an end view of the same.

Referring to said drawings, 1 indicates the side walls, and 2 the rear wall of a sheet-metal heater casing. Mounted upon the opposite side walls 1, as by bolts 3, are upturned lips or flanges 4 formed upon the opposite ends of a horizontally disposed flat plate 5 of sheet-metal which constitutes a seat adapted for the reception thereon of a plurality of radiants 6, (only one of which is shown in Fig. 1), ordinarily formed of clay, within which combustion of the gas mixture occurs and which becomes incandescent from the heat generated by such combustion, said gas mixture entering said radiants through apertures 7 provided in said seat 5. Integral upright tongues or lugs 8 struck up from said seat in forming said apertures 7 are adapted to seat against the front and rear outer faces of the lower ends of said radiants 6, whereby shifting movement of the latter on said seat is prevented. A downwardly extending flange $5^a$ formed on the rear edge of said seat 5 is attached to the rear wall 2 of the casing, as by means of one or more bolts 9.

Located within the casing at a suitably spaced distance from each side wall 1 is a vertically disposed side-plate or shield 10 which has the rear portion of its lower edge closely overlying the seat 5 and its rear edge seated against the face of the adjacent end portions $11^a$ of a substantially upright sheet-metal back-wall 11 which has a forwardly directed seating flange 12 resting upon said radiant seat 5 rearward of the apertures 7 of the latter and adjacent to the lower end of an inclined plate 22. The rear edge portion $10^a$ of said side-plate 10, which is of materially less height than the front edge portion of said plate and which is positioned at right angles to the rear wall 2, is closely approached by the adjacent endmost radiant 6 of the number which rest, as aforesaid, upon the seat 5. The front edge portions of said side-plates are divergently inclined and each thereof has a front edge flange $10^b$ adapted to be rigidly attached to a suitable portion of the heater structure, as a corner member or post (not shown). The lower end of the front edge portion of the side plate is shaped to substantially conform to the curvature of a downwardly and forwardly curved fender portion or plate 13 which has its rear edge mounted upon a downwardly and forwardly inclined front-edge flange 5ᵇ formed on the radiant seat 5. As is manifest, said side-plates 10 constitute shields for closing the spaces between the endmost radiants and the adjacent side walls 1 of the casing.

Rigidly mounted upon the reverse face of the rear edge portion 10ᵃ of each side-plate or shield 10, as by spot welding, shown at 14 in Fig. 6, is a keeper plate or member 15 shaped to provide a vertical guideway 16 in which is loosely received for vertical sliding movement the adjacent vertically disposed terminal 17ᵃ of a shiftable rod 17, preferably formed of stiff wire, which is normally seated upon the top of said rear edge portion 10ᵃ and which is designed to be engaged with the front faces of the upper end portions of the radiants 6 which rest, as aforesaid, upon the seat 5, whereby said radiants are securely retained in upright positions with their backs resting against a forwardly pressed horizontal rib 18 formed in the back-wall 11 at a suitable elevation. Said retaining rod has its body portion formed in the shape of an elongated loop or bail, as shown, and is adapted to be elevated to permit of introduction of the radiants in seated position, following which it drops into radiant retaining position.

The back-wall 11 has its upper edge portion bent to form a ledge 19 which extends rearward horizontally at substantially a right angle to the body thereof, and provided in said ledge is a plurality of draft openings 20. An upright terminal flange 19ᵃ formed on said ledge is attached to the rear wall 2 of the casing by suitable means, as by bolts 21.

Provided in the seat 5 rearward of the position occupied by the lower end of the inclined plate 22 is a plurality of alined perforations 23 designed as draft openings, said perforations being in substantial register with perforations 24 provided in the foot portion 22ᵃ of said plate. Struck up lugs 25 located adjacent to the endmost apertures 7 are designed to have the end radiants 6 seat thereagainst and to brace said radiants against lateral shifting.

It will be noted that the radiants 6 have their lower ends firmly held against shifting movement by means of the upstanding lugs 8 which rest closely against the exterior front and rear walls thereof; that the backs of said radiants firmly seat against and are braced in upright position by the apex of the rib 18 of the upright back-wall 11, and that the upper ends of said radiants are securely held by the rod 17 in a manner insuring that the seated relation of the radiants to said rib will be maintained.

What is claimed is—

1. In a radiant heater, the combination with a heater casing, of a horizontal member mounted within said casing and forming a seat for a plurality of alined tubular radiants, said member having apertures therein adapted to be embraced by such radiants, a metal back-wall located rearward of said apertures and having a part in engagement with the backs of such radiants, laterally disposed shields, and a retaining member carried by said shields, said retaining member being shiftable into and out of operative relation to the upper ends of such radiants.

2. In a radiant heater, the combination with a heater casing, of a horizontal member mounted within said casing and forming a seat for a plurality of alined tubular radiants, said member having apertures therein adapted to be embraced by such radiants, a metal back-wall located rearward of said apertures and having a horizontal rib against which the backs of such radiants rest, and laterally disposed shields having vertical guideways formed thereon, and a retaining rod supported by said shields and having members movable in said guideways, said rod being shiftable into and out of seated relation to the upper ends of such radiants.

3. In a radiant heater, the combination with a heater casing, of a horizontal radiant seat mounted within said casing, a sheet-metal back-wall mounted on said seat and having a portion engaging the backs of radiants mounted on said seat, upright shields located over the opposite end portions of said seat at a distance from the side-walls of the casing, and means mounted upon said shields and engageable with the upper end portions of the seated radiants for retaining the latter in position.

4. In a radiant heater, the combination with a heater casing, of a horizontal radiant seat mounted within said casing, a sheet-metal back-wall mounted on said seat and having means in bracing relation to radiants mounted on said seat, upright shields located over the opposite end portions of said seat at a distance from the side-walls of the casing, members forming guideways on said shields, and a retaining rod having end portions movable vertically in said guideways, said rod being adapted to engage the upper end portions of the radiants for bracing the latter.

5. In a radiant heater, the combination with a heater casing, of a horizontal radiant seat mounted within said casing, an upright sheet-metal back-wall resting upon said seat and having a portion adapted to receive thereagainst the backs of radiants mounted on said seat, a fender plate inclined downwardly from the front edge of said seat, upright sheet metal shields overlying the end portions of said seat and having their front lower edges conformably fitted over said fender plate, and shiftable means carried by said shields and engageable with the upper end portions of said radiants for retaining the latter in place.

In testimony whereof we affix our signatures in presence of two witnesses.

WILLIAM W. HOLLOWAY.
HENRY KIELBERG.

Witnesses:
G. O. SMITH,
H. E. DUNLAP.